3,536,880
METHOD AND APPARATUS FOR MACHINING THROUGH INTERMITTENT ELECTRIC DISCHARGES
Heinz Rhyner, Geneva, Switzerland, assignor to Ateliers des Charmilles S.A., Geneva, Switzerland, a corporation of Switzerland
Filed Jan. 4, 1965, Ser. No. 423,259
Claims priority, application Switzerland, Mar. 14, 1964, 3,340/64
Int. Cl. B23p 1/08
U.S. Cl. 219—69
17 Claims

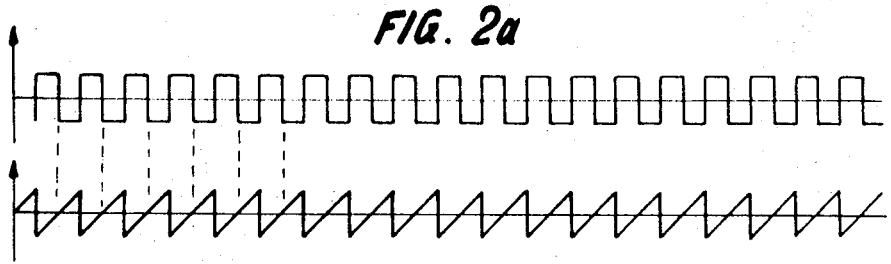
FIG. 2a
FIG. 2b
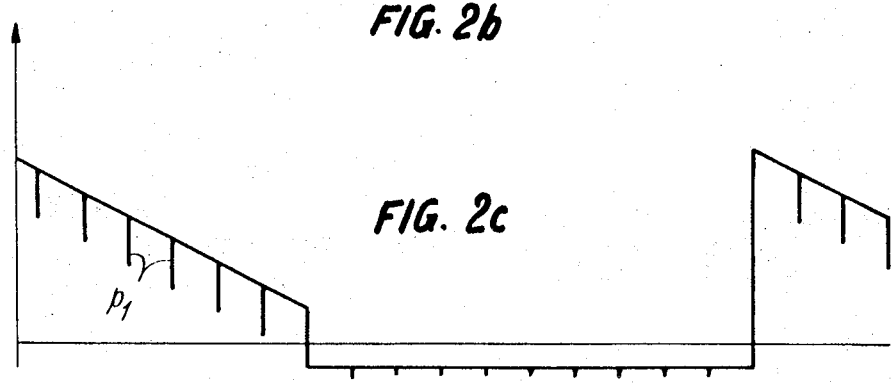
FIG. 2c
FIG. 2d
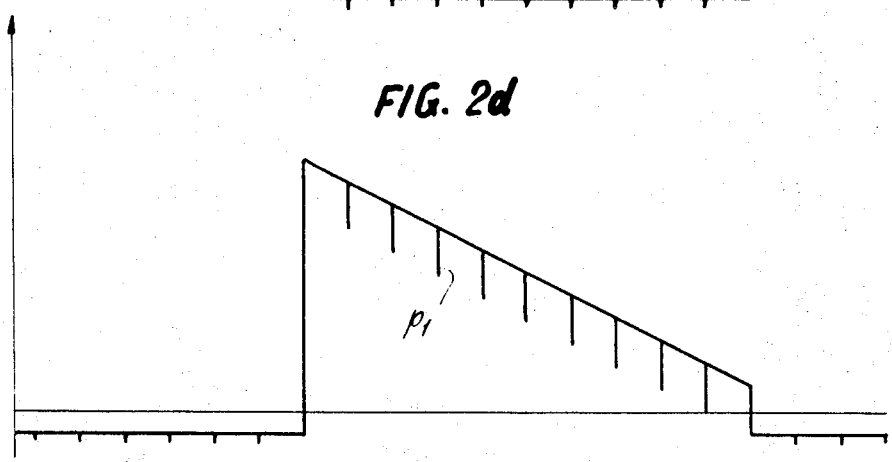
FIG. 2e
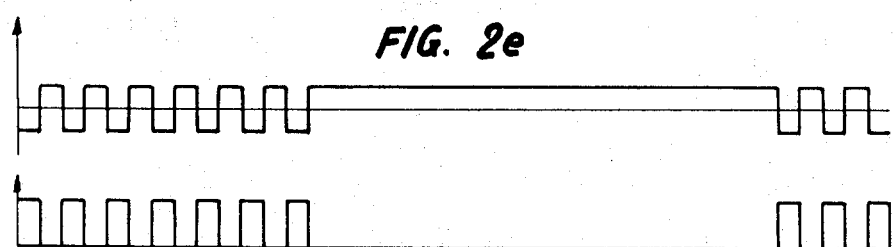
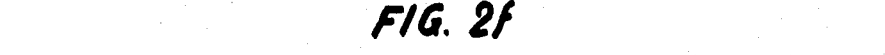
FIG. 2f United States Patent Office 3,536,880
Patented Oct. 27, 1970

ABSTRACT OF THE DISCLOSURE

Method and apparatus for machining a part of conductive material by electric discharges across a gap between the part and an electrode, comprising providing pulses to control the supply of voltage pulses to the gap and interrupting the pulses for predetermined time intervals by circuit means including synchronization means which assure that the pulses are not interrupted during an electric discharge. One embodiment of apparatus to provide the above operation comprises an oscillator connected to control the electric discharge and to trigger an astable multivibrator to interrupt the control of the electric discharge by the oscillator. Another embodiment of apparatus to provide the above operation comprises a circuit for sensing the commencement of electric discharge, circuits for controlling the duration of electric discharge and the time between pulses, and a circuit including an astable multivibrator for interrupting the control of the above circuits.

---

Various methods for machining through intermittent electric discharges are already known, according to which the discharges are executed between a conductive part to be machined and an electrode immersed in a liquid dielectric. For certain applications, it is of interest to cut off the machining current, in order to prevent or to switch off any short-circuits which may arise between the part to be machined and the electrode, for instance when the dielectric is not renewed to a sufficient extent.

It has already been proposed to interrupt the machining current by producing a mechanical receding movement, or a vibration of the electrode. Such a receding movement switches off efficiently the machining current when the electrode does not actually extend in a deep recess formed in the part to be machined. But, if the electrode has engaged such a recess, its receding movement may be not be sufficient for switching off speedily the short-circuits appearing during the machining, between the lateral walls of the electrode and those of the machined recess.

It has also been proposed to switch off the machining current upon production of a short circuit by breaking the circuit supplying said current to the electrode and to the part to be machined, or else by closing a circuit extending in parallel across the electrode and said part or work. However, when said method is to be used for machining procedures according to which controlled pulses are repeatedly applied, the voltage of which is higher than the discharge voltage between the part to be machined and the electrode, the electronic current making and breaking elements, which ensure the application of such pulses risk being damaged. This is the case in particular if the machining current is interrupted just after a pulse has been normally obtained, or else, if the machining current has been restored just before the end of the normal release of a pulse. Said risk is serious in the case of those current making and breaking elements including power transistors for high frequencies, which transistors are adapted both to control the pulses and to switch off the machining current upon formation of a short-circuit.

The present invention has for its object a machining method operating through intermittent electric discharges between a conductive part to be machined and an electrode, according to which method controlled voltage pulses are applied repeatedly to produce discharges between the part and the electrode. According to the invention, these pulses are formed by a succession of pulse trains separated by pulse-free intervals.

The accompanying drawings illustrate diagrammatically and by way of example, two embodiments of a machine which allows executing the improved method according to the invention. In said drawings:

FIGS. 2a to 2f are graphs showing the voltages in different parts of the wiring diagram according to FIG. 1;

Figure 1:
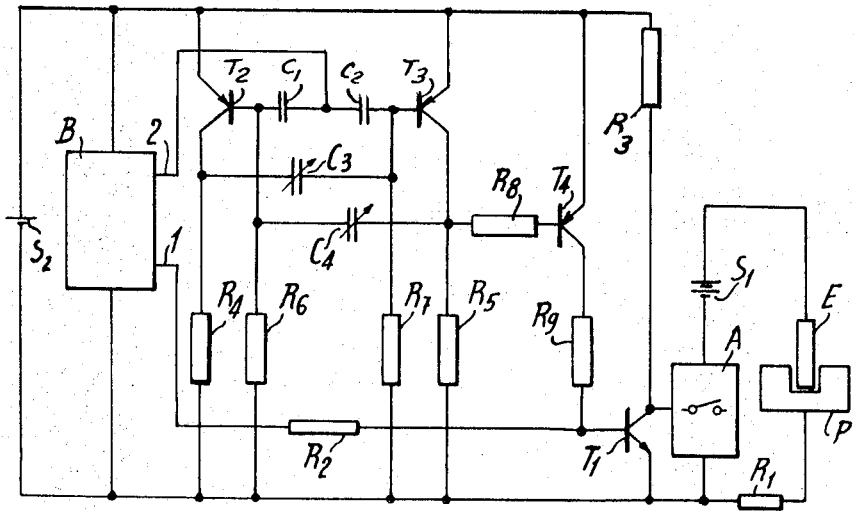
FIG. 1 is a wiring diagram of apparatus according to the first embodiment.

In the apparatus according to FIG. 1, a supply S1 feeds the electric power adapted to produce discharges between an electrode E and a part to be machined P. The circuit includes furthermore a resistance R1 and a current making and breaking element A which is constituted by a battery of semi-conductive elements of a controlled conductivity. The resistance R1 is adapted to limit the current jumping between the electrode E and the part P.

An oscillator B is fed by a supply S2 and is provided with two output terminals 1 and 2, the output terminal 1 feeding a rectangular A.C. voltage illustrated in FIG. 2a, whereas the output terminal 2 feeds a saw tooth voltage illustrated in FIG. 2b and the frequency of which is the same as that of the voltage illustrated in FIG. 2a.

The output terminal 1 is connected through a resistance R2 with the base of a transistor T1 of which the collector and emitter are connected across the terminals of the supply S2 through a resistance R3. The collector of the transistor T1 is connected with the current making and breaking element A, the voltage of said collector forming the control voltage for said element.

The output terminal 2 is connected through the two condensers C1 and C2 with the bases of the corresponding transistors T2 and T3 forming an astable multivibrator. As well known in the art, the collector of T2 is connected with the supply of current by means of a resistance R4 and with the base of T3 by means of a condenser C3, whereas the collector of T3 is connected with the supply of energy through a resistance R5 and with the base of T2 through a condenser C4. Each of the transistors T2 and T3 is biased by a resistance R6 or R7 connected in its turn with the negative terminal of the supply S2.

The potential of the collector of the transistor T3 is applied through a resistance R8 to the base of a transistor T4 of which the emitter is connected with the positive terminal of the supply S2 whereas its collector is connected through a resistance R9 with the base of the transistor T1.

The frequency fed by the oscillator B is much higher than the frequency of the multivibrator formed by the transistors T2 and T3. The frequency of the oscillator may reach several times 10 kilocycles whereas that of the multivibrator ranges between a fraction of a cycle and a few tens of cycles.

The output terminal 2 of the oscillator B is adapted to synchronize the rocking of the multivibrator with one of the sudden jumps in the saw tooth voltage illustrated in FIG. 2b.

FIG. 2c illustrates the modification in the potential of the base of the transistor T2. At the time t0, the transistor T2 in its non-conductive condition and the potential of the base is at a positive potential and which is higher than that of the positive terminal of the supply S2. Said potential decreases as a consequence of the discharge of C4, and during the decrease of said potential, the pulses p1 produced by the voltage at the output 2 of the oscillator B are transmitted by the condenser C1. At the moment at which the voltage of the base of T2 becomes negative with reference to the emitter of said transistor, which moment corresponds obviously to the presence of a pulse p1, the transistor T2 becomes conductive and its collector rises suddenly from a negative voltage fed by the supply S2 to the potential of the positive terminal of said supply. The base of the transistor T3 is subjected to a corresponding modification in voltage and since its voltage is that of the positive terminal of S2 when T2 is non-conductive, said voltage rises suddenly to a value much more positive than that precedingly provided for said base, when T2 becomes conductive, which cuts off the passage of current through the transistor T3. The modification in the voltage of the base of the transistor T3 is illustrated in FIG. 2d, the curve illustrating said voltage having the same general appearance as that of the voltage of the base of T2, including the synchronizing pulses p1. When the condenser C3 has been sufficiently discharged, the base of T3 becomes again slightly negative and allows again the current to pass through the transistor T3.

Each time the transistor T3 is conductive, the voltage of its collector and consequently that of the base of the transistor T4 have the same value as the positive terminal of S2, so that the transistor T4 is locked, that is, it becomes non-conductive. When the transistor T3 is non-conductive, the potential of its collector decreases, which leads the transistor T4 into its conductive condition.

When T4 is conductive, the base of T1 is held at a potential which is higher than that of the emitter of the said transistor T1 and since the latter is of the npn type, T1 remains permanently conductive. Consequently, the base of T1 can no longer be influenced by the rectangular pulses produced at the output 1 of the oscillator B and, since the voltage of the collector of the transistor T1 controls the locking condition of the current breaking and making element A, no discharge can be produced between the electrode E and the part P as long as the transistor T1 remains conductive.

In contradistinction, when the transistor T3 is conductive, the transistor T4 is locked, so that the voltage of the base of the transistor T1 may follow without any difficulty the modifications in voltage at the output 1 of the oscillator B which returns at each modification in the last-mentioned voltage the transistor T1 into its opposite conductive or non-conductive condition. The current making and breaking element A is actuated synchronously, so that controlled discharges are obtained between the electrode E and the part P. Thus, a train of discharges is interrupted immediately at the normal end of a discharge pulse and before the next discharge pulse has begun. This avoids any dangerous overloading of the current making and breaking elements, which overload might appear if the interruption in the machining current were to occur for instance a very short time after the starting of the discharge.

Similarly, the beginning of a further train of discharges is obtained simultaneously with the release of a discharge pulse by the output 1 of the oscillator B, whereby the first discharge of the train has the same duration as each of the following normal discharges. The risk of obtaining a shorter discharge at the beginning of the train, which would consequently lead to an overload for the current making and breaking element, is thus avoided completely.

Figure 3:
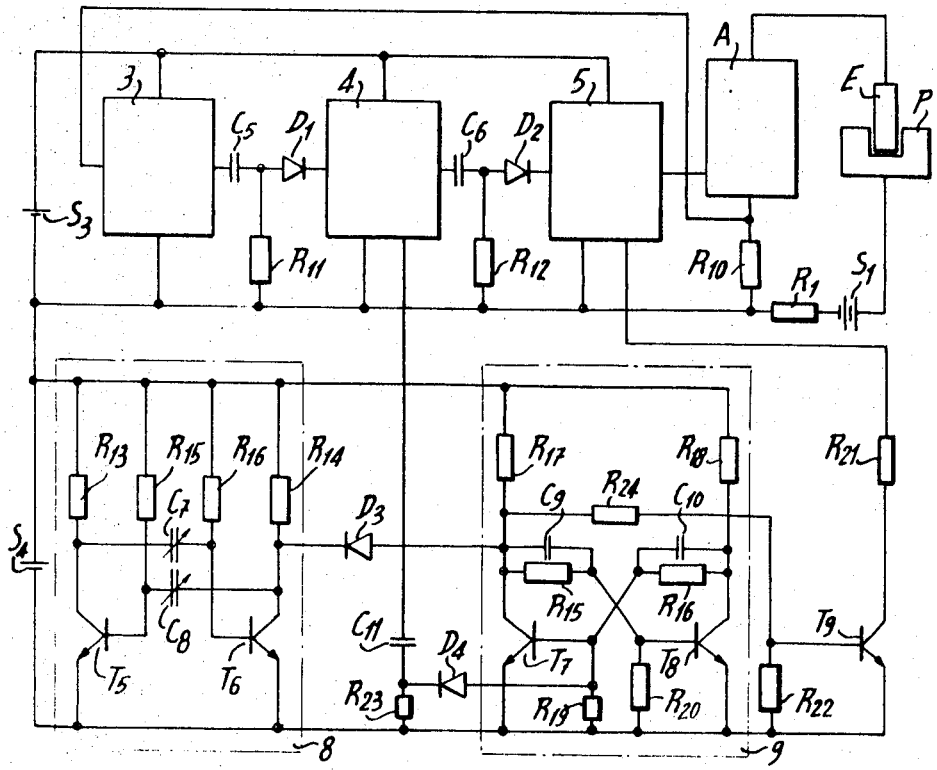
FIG. 3 is a wiring diagram of a second embodiment.

FIG. 3 illustrates a second embodiment of which a fraction has been illustrated only very diagrammatically as a block diagram, each of said blocks relating to an assembly well known per se and furthermore, the detail of said assembly is disclosed in patent application No. 423,237 of common ownership herewith.

FIGS. 4a to 4e are graphs illustrating the voltages of different elements of said wiring diagram to show the operation of the latter.

Turning to FIG. 3, a supply S1 feeds a circuit in which the passage of current is controlled by a current making and breaking element A, so as to produce discharges between an electrode E and a part P. The maximum current which may be fed by the supply S1 is limited by a resistance R1 which is associated with a resistance R10 in series therewith. This latter resistance is adapted to supply a voltage as soon as the discharge current has been established between the electrode and the part P. It allows thus detecting the appearance of the current, which may be more or less delayed with reference to the moment at which the current making and breaking element A is closed. As a matter of fact, a delay of an undefined value which varies substantially from one discharge to the next, elapses between the moment at which the element A becomes conductive and the moment at which the discharge current reaches its normal value. When the discharges are executed at a frequency of several kilocycles, said delay may be by no means negligible with reference to the duration of each discharge.

The machine illustrated is adapted to produce discharges of similar durations independently of the delay which may precede each of the discharges. Said machine which is described in detail in the above-referred to patent application, includes a Schmitt trigger 3 and two monostable multivibrators 4 and 5. These three components are fed by a supply S3. The voltage tapped off the terminals of R10 in the discharge circuit is applied to the input 6 of the Schmitt trigger 3 which supplies at its output terminal 7 pulses similar to those obtained across the terminals of R10, but said pulses are purified in so far that the output voltage jumps suddenly between two well defined values and is devoid of the irregularities which may appear in the voltage across the terminals of R10.

The voltage at the output of the Schmitt trigger 3 is applied to the input of the multivibrator 4 through a differentiating system constituted by a condenser C5 and a resistance R11 associated with a diode D1. Said diode allows only the positive pulses appearing across the terminals of R11 to be applied to the multivibrator 4, each of said pulses bringing said multivibrator into its non-stable condition. After each pulse, the multivibrator returns into its stable condition after a delay defined by its electric parameters.

The output pulses fed by the multivibrator 4 are also applied to a differentiating element associated with a diode D2 and constituted by a resistance R12 and a condenser C6 in a manner such that a positive pulse is applied to the input of the multivibrator 5 each time the multivibrator 4 returns from its non-stable condition into its stable condition.

The multivibrator 5 controls the current making and breaking element A so as to ensure conductivity for the latter as long as said multivibrator is in its stable condition and so as to make said element A nonconductive each time the multivibrator 5 is in its non-stable condition.

Figure 4A:
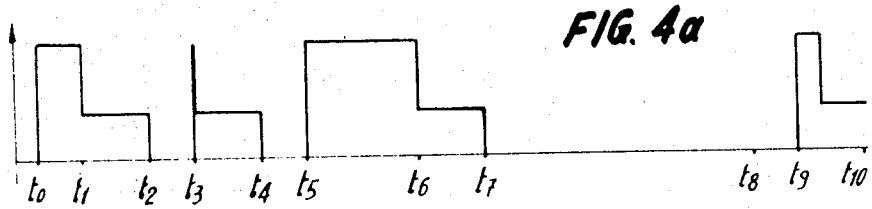
FIGS. 4a to 4e are graphs showing the voltages in different parts of the diagram according to FIG. 3.
Figure 4B:
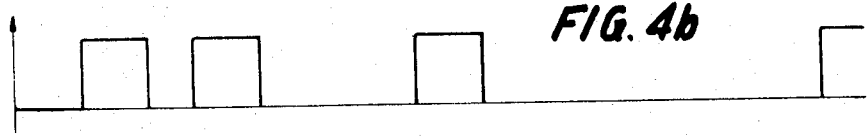

The operation of said first section of the circuit is explained hereinafter, reference being made to FIGS. 4a and 4e which illustrate respectively the voltage across the terminals of the machining gap extending between the electrode E and the part P and the current fed by the supply S1. FIG. 4a shows that the current making and breaking element A is closed at the time t0, whereby the voltage of the supply S1 is applied across the gap between the electrode and the part up to the time t1; during said first period which is generally shorter than 1 millisecond, the discharge is not yet obtained and no substantial current flows between the electrode and the part. At the time t1, the discharge is initiated so that the voltage between the electrode and the part drops down to the value of the arcing voltage and the discharge continues up to the time t2 at which it is interrupted. At the time t0, the element A becomes conductive under the action of the multivibrator 5, and at the time t1 when the discharge current is initiated, the voltage appearing across the terminals of R10 leads to the production of a pulse applied by the Schmitt trigger 3 to the input of the multivibrator 4, so as to bring the latter into its non-stable condition. Said non-stable condition lasts between t1 and t2 and at the moment at which the multivibrator 4 returns into its stable condition, there is obtained a pulse which is applied to the multivibrator 5 so as to bring the latter into its non-conductive condition between t2 and t3, which makes the current making and breaking element A non-conductive during said period. At the time t3, the element A is again conductive and it is assumed that the discharge is obtained immediately without any delay. The duration of the discharge between t3 and t4 is again defined by the period of instability of the multivibrator 4, whereas the interruption between t4 and t5 is defined by the period of instability of the multivibrator 5. Between t5 and t6, and the delay is assumed to reach a value which is substantially larger than the duration of a discharge. The discharge begins only at the time t6 and lasts up to t7. The interruption during the period elapsing between t7 and t9 is controlled purposely by the lower section of the wiring diagram illustrated in FIG. 3 and the operation of which will be disclosed hereinafter. At the time t9, the current making and breaking element A is closed and a further series of pulses may be produced.

The lower section of FIG. 3 includes an astable multivibrator 8 operating as a generator of a low frequency rectangular wave and a system 9 forming a bistable multivibrator, that is a flip-flop arrangement.

The multivibrator 8 is of a conventional type and includes two transistors T5 and T6 fed by a supply S4. The collectors of said last-mentioned transistors are connected with the positive terminal of the supply S4 through the resistances R13 and R14 respectively, while their bases are connected with the same terminal through the resistances R15 and R16. The collector of T5 is connected with the base of T6 through the variable condenser C7 adapted to define the duration of interruption of the machining current, whereas the base of T5 is connected with the collector of T6 through a variable condenser C8 adapted to define the time elapsing between two interruptions of the machining current.

The collector of T6 is also connected through the diode D3 with the collector of the transistor T7 of the flip-flop arrangement 9. The second transistor T8 of said flip-flop arrangement 9 has its base connected with the collector of T7 through a resistance R15 shunted by a condenser C9. Similarly, the base of T7 is connected with the collector of T8 through a resistance R16 shunted by a condenser C10. The collectors of T7 and T8 are connected with the positive terminal of the supply S4 through the resistances R17 and R18 respectively, while the emitters of said transistors are connected directly with the negative pole of said supply. The bases of said two transistors are also connected with said same pole through the resistances R19 and R20 respectively.

The potential of the collector of the transistor T7 is applied to the base of a transistor T9 of the npn type of which the emitter is connected with the negative pole of S4 and of which the collector is connected through a resistance R21 with the base of the transistor, which is not illustrated, of the multivibrator 5. The base of T9 is connected on the one hand with the negative pole of S4 through a resistance R22 and, on the other hand, with the collector of the transistor T7 through a resistance R24.

The base of the transistor T7 is adapted to receive a signal from the multivibrator 4, said signal being in phase opposition with that applied to the condenser C6.

Said signal from the multivibrator 4 is fed through a differentiating element including a condenser C11 and a resistance R23 to the base of the transistor T7 and is transmitted to said base through a diode D4, whereby only the negative pulses produced simultaneously with the interruption of a discharge, for instance at the moments t2, t4, t7 and t10 reach the base of the transistor T7.

The operation of the multivibrator 8 is conventional: When one transistor is conductive, the other is in its non-conductive condition and conversely. When the base of a transistor such as the transistor T5 has been brought to a negative potential, said transistor is locked during a time defined chiefly by the time constant of the C8 and R15 circuit. As a matter of fact, the condenser C8 is connected, on the one hand, with the collector of T6 the potential of which is that of the negative pole of the supply S4 due to the conductive condition of T6 and, on the other hand, with the positive pole of the source S4 through the resistance R15. Thus said condenser C8 causes the potential of the base of T5 to rise gradually up to the value of the potential of the positive terminal of S4. But as soon as said potential reaches a value just above that of the emitter of T5, said transistor becomes again conductive and the potential of its collector passes suddenly from a positive value to the negative value of the potential of S4. Said lower voltage is transmitted through the condenser C7 to the base of the transistor T6 which is thus returned into its non-conductive condition. After discharge of the condenser C7, the transistor T6 becomes again conductive and thus locks the transistor T5. The lower potential of the collector of T6 which is obtained each time said transistor becomes conductive is transmitted by the diode D3 to the collector of the transistor T7, and through the agency of the resistance R15 and of the condenser C9, to the base of the transistor T8, which renders the latter nonconductive if it was precedingly conductive.

Through the diode D4 and the differentiating circuit including the condenser C11 and the resistance R23, the base of the transistor T7 receives negative pulses from the monostable multivibrator 4 at the moment at which the latter rocks into its position corresponding to the end of the discharge between the electrode E and the part P, that is at the moment t4, t5, t7 . . . and the transistor T7 is thus brought into its non-conductive condition if it was precedingly in a conductive condition at the incoming of a pulse. Each negative pulse reaching the base of the transistor T7 has therefore for its result to make the flip-flop 9 rock into the position for which the transistor T8 is conductive, except if the transistor T6 is conductive since, in this latter case, the transistor T7 is shunted by the operative transistor T6, which prevents any rise in voltage for the collector of T7 which would be necessary to bring the transistor T8 into its conductive condition. In such a case, the transistor T7 remains conductive as long as T6 is also conductive, except for a short interruption of its operation during each negative pulse applied to its base.

Figure 4C:
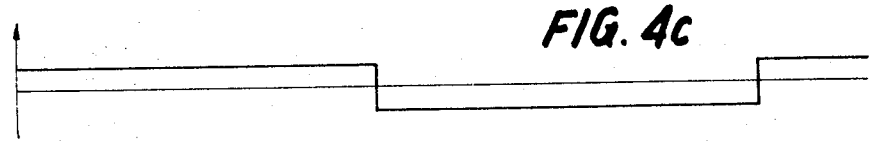
Figure 4D:
Figure 4E:
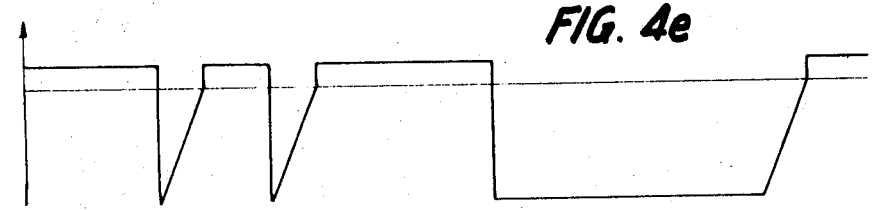

The potential of the base of the transistor T7 follows thus the curve of FIG. 4d, whereas the potential of the base of the transistor T6 is given by the curve of FIG. 4c.

The flip-flop arrangement 9 acts on the multivibrator 5 through the agency of the transistor T9 which becomes conductive each time the transistor T7 is locked, since the rise in the potential of the collector of the latter is transmitted to the base of T9 through the voltage divider formed by the resistances R24 and R22.

When T9 is conductive, the negative voltage of the supply S4 is applied to the monostable multivibrator 5 so as to lock the latter in its nonstable condition for which the current making and breaking element A allows no passage of current. The consequence is that the voltage pulses producing discharges between the electrode E and the part P are cut off as long as the transistor T6 remains in its non-conductive condition.

This second embodiment allows also interrupting without any difficulty a succession of discharges without any risk of damaging the current making and breaking element A as a consequence of an untimely failure of the current. As a matter of fact, a train of discharges can be cut out only after the normal end of a discharge and the following train can be started only with the normal beginning of a discharge.

In the two embodiments described, it is of advantage to produce mechanically a receding movement of the electrode, so as to move it away from the part to be machined during at least some of or even all the interruptions between two successive trains of waves. Since, in principle, the duration of the interruption is very short, the receding movement of the electrode is small and reaches at a maximum a few mm. Said receding movement is however sufficient for the production of a sort of pumping of the dielectric liquid, which ensures a circulation of the latter within the space extending between the electrode and the part to be machined.

In both embodiments described, the voltage between the electrode and the part to be machined serves as is usual, when machining through intermittent discharges, as a control for an auxiliary mechanism, not illustrated, which controls the progression of the electrode. In fact, during said interruption the voltage between the electrode and the part is zero and ensures in a well known manner the receding movement of the electrode.

It is obviously possible to bring numerous modifications to the two embodiments illustrated of a machine according to the invention. In particular, the astable multivibrator including the transistors T2 and T3 as illustrated in FIG. 1 and also the multivibrator 8 of FIG. 3, may be replaced by monostable multivibrators passing from their stable into their non-stable condition as a response to any reduction in the impedance of the circuit between the electrode and the part to be machined, for instance upon formation of a short circuit between the electrode and said part. This would result in that the pulse trains (FIG. 1) or discharge trains (FIG. 3) are brought to an end after such a reduction in impedance, said trains being separated by time intervals which are substantially equal to the duration of the non-stable condition of said monostable multivibrators.

I claim:

1. A method for machining a part of conductive material facing an electrode with a gap therebetween through intermittent electric discharges across said gap, said method comprising periodically forming across said gap a succession of discharge-producing pulse trains separated by pulse-free intervals by connecting said conductive material and said electrode in a circuit means to create said gap, said circuit means having pulse generating means controlling the circuit means to produce intermittent voltage pulses resulting in intermittent discharges across the gap, said pulse generating means including first means for providing pulses to control the circuit means, second means for interrupting the control of the circuit means by the first means for predetermined time intervals an synchronization means connected between the first and second means to avoid interruption of the pulses provided by the first means during an electric discharge across the gap, so that the durations of the pulses of each train, including the first and last pulses, will be all equal.

2. A method for machining a part of conductive material facing an electrode with a gap therebetween through intermittent electric discharges across said gap, said method comprising periodically forming across said gap a succession of discharge-producing pulse trains separated by pulse-free intervals by connecting said conductive material and said electrode in a circuit means to create said gap, said circuit means having pulse generating means controlling the circuit means to produce intermittent voltage pulses resulting in intermittent discharges across the gap, said pulse generating means including first means for providing pulses to control the circuit means, second means for interrupting the control of the circuit means by the first means for predetermined time intervals and synchronization means connected between the first and second means to avoid interruption of the pulses provided by the first means during an electric discharge across the gap, so that the durations of the discharges produced by the pulses of each train, including the first and last discharges, will be all equal.

3. A method for machining a part of conductive material facing an electrode with a gap therebetween through intermittent electric discharges across the gap, said method comprising forming across said gap a succession of discharge-producing pulse trains separated by pulse-free intervals by connecting said conductive material and said electrode in a circuit means to create said gap, said circuit means having pulse generating means controlling the circuit means to produce intermittent voltage pulses resulting in intermittent discharges across the gap, said pulse generating means including first means for providing pulses to control the circuit means, second means for interrupting the control of the circuit means by the first means for predetermined time intervals and synchronization means connected between the first and second means to avoid interruption of the pulses provided by the first means during an electric discharge across the gap, and causing the electrode to recede with reference to the part to be machined during said pulse-free intervals.

4. Apparatus for machining a part of conductive material through electric discharges across a gap between said part and an electrode, said apparatus comprising circuit means connected with said part and said electrode for supplying voltage across said gap, pulse generating means controlling said circuit means to produce intermittent voltage pulses across said gap and thereby intermittent discharges across said gap, said pulse generating means including first means for providing pulses to control said circuit means second means for interrupting the control of said circuit means by said first means for predetermined time intervals and synchronization means between said first means and said second means to avoid interruption of the pulses provided by said first means during an electric discharge.

5. The invention as recited in claim 4 wherein said second means includes oscillator means having a frequency less than the frequency of the pulses provided by said first means.

6. The invention as recited in claim 5 wherein said oscillator means includes an astable multivibrator.

7. The invention as recited in claim 4 wherein said pulse generating means further includes oscillator means having a first output connected with said first means and a second output connected with said second means whereby the pulses provided by said first means are not interrupted during an electric discharge.

8. The invention as recited in claim 7 wherein said second means includes an oscillator having a frequency less than the frequency of said pulses provided by said first means.

9. The invention as recited in claim 8 wherein said first means includes transistor means for providing said pulses to said circuit means, and said second means includes means connecting said oscillator of said second means to said transistor means to prevent the application of said pulses to said circuit means.

10. The invention as recited in claim 9 wherein said oscillator of said second means includes means connected with said first output of said oscillator means for assuring that each pulse generated by said oscillator coincides with a pulse from said oscillator means.

11. Apparatus for machining a part of conductive material through electric discharges across a gap between said part and an electrode, said apparatus comprising circuit means connected with said part and said electrode for supplying voltage across said gap, switch means connected with said circuit means to produce intermittent voltage pulses across said gap and thereby intermittent discharges across said gap, first means for sensing the commencement of discharge across said gap, second means responsive to said first means to supply pulses to said switch means to control the duration of said discharges, and third means responsive to said second means to interrupt the control of said switch means by said second means for predetermined time intervals.

12. The invention as recited in claim 11 wherein said third means includes oscillator means having a frequency less than the frequency of the pulses supplied to said switch means.

13. The invention as recited in claim 12 wherein said third means includes fourth means responsive to said oscillator means and said second means to interrupt the control of said switch means by said second means to prevent the production of discharges during predetermined time intervals.

14. The invention as recited in claim 11 wherein said second means includes first timing means connected with said sensing means for controlling the duration of said discharges and second timing means connected with said first timing means and said switch means for controlling the time between voltage pulses applied across said gap.

15. The invention as recited in claim 14 wherein said third means includes fourth means responsive to said first timing means to interrupt the control of said switch means by said second timing means.

16. The invention as recited in claim 15 wherein said third means includes oscillator means having a frequency less than the frequency of the pulses applied to said switch means, and said fourth means includes fifth means responsive to said first timing means and said oscillator means to interrupt the control of said switch means by said second timing means.

17. The invention as recited in claim 16 wherein said first timing means includes a monostable multivibrator, said second timing means includes a monostable multivibrator, said oscillator means includes an astable multivibrator and said fourth means includes a bistable multivibrator.

References Cited

UNITED STATES PATENTS

| | | |
|---|---|---|
| 3,056,065 | 9/1962 | Porterfield. |
| 2,804,575 | 8/1957 | Matulaitis _____ 219—69 X |
| 2,835,785 | 5/1958 | Williams _____ 219—69 |
| 3,292,040 | 12/1966 | Ullmann et al. _____ 219—69 X |

FOREIGN PATENTS 759,190  10/1956  Great Britain.

RALPH F. STAUBLY, Primary Examiner